(12) United States Patent
Wyner et al.

(10) Patent No.: US 7,553,779 B2
(45) Date of Patent: Jun. 30, 2009

(54) PROTECTIVE LAMINATES

(75) Inventors: Daniel M. Wyner, N. Scituate, RI (US);
Richard Pierce, Plymouth, MA (US);
Michael Nahmias, Wakefield, RI (US);
Gregory F. Carey, Plymouth, MA (US);
James H. Wyner, Boston, MA (US);
Ralph Birchard Lloyd, Fayetteville, NC (US)

(73) Assignees: Shawmut Corporation, West Bridgewater, MA (US); E.I. Du Pont de Nemours and Company, Wilmington, DE (US)

( * ) Notice: Subject to any disclaimer, the term of this patent is extended or adjusted under 35 U.S.C. 154(b) by 377 days.

(21) Appl. No.: 11/007,092

(22) Filed: Dec. 7, 2004

(65) Prior Publication Data

US 2005/0266754 A1 Dec. 1, 2005

Related U.S. Application Data

(63) Continuation-in-part of application No. 10/732,554, filed on Dec. 10, 2003.

(51) Int. Cl.
*B32B 3/00* (2006.01)
*B32B 5/02* (2006.01)

(52) U.S. Cl. .......................... 442/59; 442/76; 442/261; 442/289

(58) Field of Classification Search .................. None
See application file for complete search history.

(56) References Cited

U.S. PATENT DOCUMENTS

| | | | |
|---|---|---|---|
| 3,899,810 A | 8/1975 | Stanley et al. | 28/72.6 |
| 4,034,417 A | 7/1977 | Ellis | 2/81 |
| 4,194,041 A | 3/1980 | Gore et al. | |
| 4,218,779 A | 8/1980 | Hart et al. | 2/168 |
| 4,469,744 A | 9/1984 | Grot et al. | |
| 4,515,761 A | 5/1985 | Plotzker | |
| 4,518,650 A | 5/1985 | Grot et al. | 428/286 |
| 4,594,286 A | 6/1986 | McKinney et al. | 428/245 |
| 4,758,465 A | 7/1988 | McKinney et al. | 428/252 |

(Continued)

FOREIGN PATENT DOCUMENTS

EP 0 465 817 A1 5/1992

(Continued)

OTHER PUBLICATIONS

International Search Report, from corresponding PCT/US04/40910, mailed May 5, 2005.

(Continued)

*Primary Examiner*—David R Sample
*Assistant Examiner*—Altrev C Sykes
(74) *Attorney, Agent, or Firm*—Nutter McClennen & Fish LLP

(57) ABSTRACT

Protective laminates are provided that include (a) a layer that is breathable and highly impermeable to chemicals to a degree that is subject to reduction upon flexing of the highly impermeable layer alone; and (b) a breathable non-textile layer attached to the highly impermeable layer, the non-textile layer mitigating the reduction in the impermeability of the highly impermeable layer if the laminate is flexed. The laminates may, for example, be attached to textiles and used in protective fabrics.

26 Claims, 1 Drawing Sheet

U.S. PATENT DOCUMENTS

| | | | |
|---|---|---|---|
| 4,803,116 A | 2/1989 | Amano et al. | 428/286 |
| 4,860,382 A | 8/1989 | Markwell | 2/82 |
| 4,943,475 A | 7/1990 | Baker et al. | 428/246 |
| 5,017,424 A | 5/1991 | Farnworth et al. | 428/230 |
| 5,024,594 A | 6/1991 | Athayde et al. | 428/246 |
| 5,026,591 A | 6/1991 | Henn et al. | 428/198 |
| 5,098,770 A | 3/1992 | Paire | 428/198 |
| 5,112,666 A | 5/1992 | Langston | 428/104 |
| 5,182,163 A | 1/1993 | Wheat et al. | 428/224 |
| 5,220,692 A | 6/1993 | Cox | 2/48 |
| 5,221,572 A | 6/1993 | Meunier | 428/231 |
| 5,236,769 A | 8/1993 | Paire | 428/198 |
| 5,264,276 A | 11/1993 | McGregor et al. | 428/252 |
| 5,391,426 A | 2/1995 | Wu | 428/246 |
| 5,418,054 A | 5/1995 | Sun | 428/308.4 |
| 5,445,874 A | 8/1995 | Shehata | 428/252 |
| 5,529,830 A | 6/1996 | Dutta et al. | 428/176 |
| 5,562,977 A | 10/1996 | Jager et al. | 428/287 |
| 5,565,254 A | 10/1996 | Norvell | 428/71 |
| 5,569,507 A | 10/1996 | Goodwin et al. | 428/76 |
| 5,700,544 A | 12/1997 | Goodwin et al. | 428/76 |
| 5,740,551 A | 4/1998 | Walker | 2/16 |
| 5,824,405 A | 10/1998 | White | 428/304.4 |
| 5,869,193 A | 2/1999 | Langley | 428/520 |
| 5,960,475 A | 10/1999 | Fewtrell | 2/82 |
| 6,037,281 A | 3/2000 | Mathis et al. | 442/394 |
| 6,395,383 B1 | 5/2002 | Maples | 428/319.3 |
| 6,531,419 B1 | 3/2003 | Wyner et al. | |
| 2002/0106959 A1 | 8/2002 | Huffines et al. | 442/394 |
| 2002/0112272 A1 | 8/2002 | Culler et al. | 2/161.6 |
| 2005/0130521 A1 | 6/2005 | Wyner et al. | |
| 2006/0019566 A1 | 1/2006 | Lloyd et al. | |

FOREIGN PATENT DOCUMENTS

| | | |
|---|---|---|
| JP | 7-88057 | 4/1995 |
| JP | 8-197686 | 6/1996 |
| JP | 8-294982 | 12/1996 |
| JP | 63-72527 | 2/1998 |
| WO | WO 97/00710 | 1/1997 |

OTHER PUBLICATIONS

Kawano, Y., "Stress-Strain Curves on Nafion Membranes in Acid and Salt Forms," Pol'meros: Ciencia e Tecnologia 12(2):96-101 (2002).

PROTECTIVE LAMINATES

CROSS-REFERENCE TO RELATED APPLICATIONS

This application is a continuation in part (and claims the benefit of priority under 35 USC 120) of U.S. application Ser. No. 10/732,554 filed Dec. 10, 2003. The disclosures of the prior application is considered part of (and is incorporated by reference in) the disclosure of this application.

TECHNICAL FIELD

This invention relates to protective laminates.

BACKGROUND

Protective garments, e.g., garments used by emergency workers, are generally made of fabrics that protect the wearer from the conditions the wearer expects to encounter, e.g., heat and flame in the case of firefighting garments. The fabrics used in such garments are typically waterproof and allow water vapor to pass from inside to outside the garment to provide comfort to the wearer during periods of exertion. An example of a waterproof breathable laminate produced from an expanded polytetrafluoroethylene ("ePTFE") membrane is disclosed in U.S. Pat. No. 4,194,041. In this structure, the pores of the ePTFE are protected by a hydrophilic polyurethane layer, to prevent the pores of the ePTFE from becoming contaminated by lower surface energy liquids. Lower surface energy liquids tend to wet out untreated microporous structures, thereby reducing the hydrostatic resistance of the membrane and corresponding laminate structure.

Fabrics for protective garments may include a textile layer and a layer of a protective film that provides waterproofing. The protective film may be, for example, a treated microporous film, e.g., a film such as ePTFE as described in U.S. Pat. No. 4,194,041 above that has pores sized to permit vapor molecules to pass, while blocking water molecules, but has its surface energy modified to reduce its ability to wet out. Alternatively, the protective film could be a monolithic layer produced from a hydrophilic material such as polyurethane, nylon, or polyether block amides such as the polymer sold by Arkema under the trademark PEBAX®.

In many applications, it is necessary that the fabric be highly chemically resistant. For example, the Standard on Protective Ensemble for Structural Fire Fighting published by the National Fire Protection Agency (NFPA 1971, 2000 Edition) require the moisture barrier layer of fire fighting garments to resist penetration by a list of chemicals in accordance with ASTM F903 (Standard Test Method for Resistance of Protective Clothing Materials to Penetration by Liquids). Other applications, such as military applications and hazardous waste clean-up, also require high chemical resistance, but known laminates may not allow for effective transport of moisture, leading to heat stress.

It is important that fabrics used in protective garments be capable of withstanding laundering without loss of chemical resistance or, if laminated to a textile, to have resistance to de-lamination of the protective film from the textile.

SUMMARY

The inventors have found that certain chemically resistant breathable films are relatively brittle and may fracture easily when flexed under certain conditions. This brittleness may render fabrics including such films subject to a decrease in chemical impermeability after laundering, due to the impact of the wet environment of laundering on the physical properties of the film. Some chemically resistant breathable films are also subject to a decrease in their impermeability as a result of flexing under dry conditions. The inventors have addressed this problem by providing protective laminates including a highly impermeable layer and a non-textile layer that tends to mitigate the reduction in the impermeability of the highly impermeable layer if the laminate is flexed.

In one aspect, the invention features a protective laminate that includes (a) a layer that is breathable and highly impermeable to one or more chemicals to a degree that is subject to reduction as a result of flexing of the highly impermeable layer alone; and (b) a hydrophilic non-textile layer attached to the highly impermeable layer, the non-textile layer mitigating the reduction in the impermeability of the highly impermeable layer that is a result of flexing of the laminate.

The term "breathable," as used herein, refers to the moisture vapor transmission rate (MVTR) of a material. A breathable film preferably has a MVTR of at least 200 $g/m^2/day$, measured by ASTM E96B.

The phrase "highly impermeable to one or more chemicals," as used herein, means that the layer would significantly inhibit the flow of harmful chemicals from one side of the layer to the other. This phrase does not mean that the layer is necessarily impermeable to all fluids; for example, it may be permeable to water vapor. Preferably, impermeability is sufficient to comply with the liquid penetration resistance requirement associated with NFPA 1971, 2000 edition. Some highly impermeable layers may also comply with the chemical permeation resistance test required by NFPA 1994, as tested according to ASTM F739.

The phrase "subject to reduction upon flexing of the highly impermeable layer alone," means that if the highly impermeable layer is not attached to the non-textile layer, the chemical resistance of the highly impermeable layer will be deleteriously affected by flexing the highly impermeable layer. In some cases, the reduction in chemical resistance may occur after only a single flexing.

The term "non-textile" refers to an organic polymeric sheet material that is not manufactured from fibrous materials, and excludes, for example, woven and non-woven fibrous sheet materials, but includes, for example, polymeric film materials such as ePTFE which, although having some fibrous character, i.e., a fine structure of interconnected nodes and fibrils, is made using PTFE fine powder.

The phrase "mitigating the reduction in the impermeability" means that the reduction in impermeability that would occur upon flexing of the highly impermeable layer alone is reduced to a measurable extent when the protective laminate is tested, before and after repeated flexing, under the same conditions using the same test procedure. Testing may be performed, for example, using a Newark Flexing Machine according to the test procedures specified in ASTM D2097, under the environmental conditions specified in ASTM D1610.

The term "layer" refers to a discrete region of material, which, unless otherwise noted (e.g., by specifying that the layer is free-standing), may be in the form of a continuous film, coating, deposit, or any other desired form.

Some implementations include one or more of the following features. The laminate may further include a second non-textile layer, and the highly impermeable layer may be interposed between the non-textile layers. Alternatively, the laminate may further include a second highly impermeable layer, and the non-textile layer may be interposed between the highly impermeable layers. The laminate may further include a textile layer attached to the highly impermeable layer or the non-textile layer, e.g., to form a protective fabric. The protective laminate may have a MVT of at least 200, preferably at least 2000. The layers may each individually have a MVT of at least 200. The layers may each be microporous or monolithic. The highly impermeable layer may have a thickness of about 5 to about 50 μm. The non-textile layer may have a thickness of about 1 to about 50 μm. The laminate may further include an adhesive layer attaching the non-textile layer to the highly impermeable layer. The adhesive layer may be discontinuous. Alternatively, the non-textile layer may be bonded directly to the highly impermeable layer, without intervening adhesive. The non-textile layer may comprise a free-standing film, for example a film selected from the group consisting of polyurethane films, expanded PTFE films, polyester films, nylon films, polyether block amide films, and polyethylene films. The non-textile layer may be hydrophilic.

In a further aspect, the invention features a protective laminate including (a) a layer that is breathable, and highly impermeable to chemicals to a degree that is subject to reduction upon flexing of the highly impermeable layer alone; (b) a non-textile layer attached to the highly impermeable layer, the non-textile layer mitigating the reduction in the impermeability of the highly impermeable layer if the laminate is flexed; and (c) a second non-textile layer, wherein the highly impermeable layer is interposed between the non-textile layers.

The invention also features protective laminates that include a first layer that includes a fluorinated ion exchange polymer, and a breathable hydrophilic polymer layer attached to the first layer.

In another aspect, the invention features a method including bonding a layer that is breathable and highly impermeable to chemicals to a degree that is subject to reduction upon flexing of the highly impermeable layer, to a breathable, hydrophilic non-textile layer, the non-textile layer mitigating the reduction in the impermeability of the highly impermeable layer if the laminate is flexed.

Some implementations may include one or more of the following features. The bonding step may include applying an adhesive to one or both layers. The adhesive may be applied in a discontinuous pattern. The adhesive may be applied in a continuous pattern using a hydrophilic polymer. The adhesive may be applied by gravure printing. The bonding step may include thermally bonding the non-textile layer directly to the highly impermeable layer.

The invention also features other methods of forming the laminates described above by bonding together the various layers of the laminates, and laminates that include the features described herein in any desired combination.

In a further aspect, the invention features articles made with the protective laminates. For example, the invention features an article including: (a) a protective laminate that includes (i) a layer that is breathable and highly impermeable to chemicals to a degree that is subject to reduction upon flexing of the highly impermeable layer alone; and (ii) a breathable non-textile layer attached to the highly impermeable layer, the non-textile layer mitigating the reduction in the impermeability of the highly impermeable layer if the laminate is flexed; and (b) a textile layer, attached to the protective laminate to form a chemically resistant fabric, the chemically resistant fabric being configured to define the article.

The article may be, for example, a protective structure such as a tent, a garment such as a jacket, pair of pants or glove, or an insert for footwear.

Among the advantages of the invention may be one or more of the following.

In some implementations, the protective laminates are selectively permeable, i.e., they exhibit high moisture vapor transmission rates, while also being able to restrict the passage of harmful chemicals, preferably under conditions where a pressure differential exists. The laminates may be attached to a textile layer for use in articles such as protective garments, tents and accessories that may be subjected to adverse conditions. Some laminates, when attached to a textile layer, provide excellent chemical resistance even after repeated launderings and/or other flexing such as may occur during use of a garment. In some implementations, fabrics including the protective laminate meet NFPA standards for flame-retardancy and chemical resistance. The laminates are waterproof and breathable. In some cases, the laminates may meet the requirements of the chemical permeation resistance test required by NFPA 1994, as tested according to ASTM F739. The laminates can be produced repeatably and predictably. The laminates are easily stored, shipped, and manipulated during lamination to a textile layer. The barrier properties of the laminate are maintained prior to lamination to a textile layer. In certain applications, such as semi-durable and durable garments, it is useful to achieve resistance to water penetration and provide chemical resistance after multiple launderings. In military applications, a minimum of 6 wash/dry cycles is typically requested, whereas in the Fire Service the chemical penetration testing is done after 5 wash/dry cycles complying with a procedure specified in AATCC 135. Fabrics produced with some protective laminates may protect the wearer of a garment or contents of a protective structure from noxious gases, such as Sarin, Mustard, and VX nerve agents and other noxious chemical agents. Fabrics produced with some protective laminates may show no evidence of penetration of a solution consisting of 75% diethyltoluamide (DEET) and 25% ethanol before and after laundering when tested according to paragraphs 4.4.2.6 and 4.4.14 of MIL-DTL-31011A.

The details of one or more embodiments of the invention are set forth in the accompanying drawings and the description below. Other features and advantages of the invention will be apparent from the description and drawings, and from the claims.

DETAILED DESCRIPTION

Figure 1:
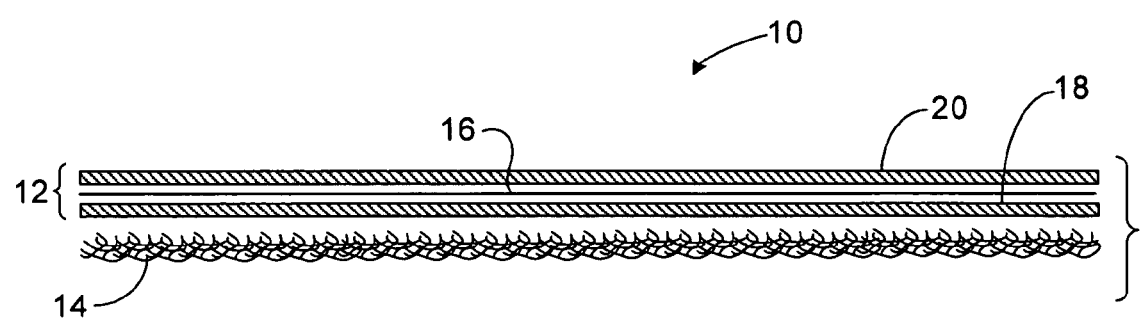
FIG. 1 is a diagrammatic, highly enlarged exploded side view of a protective fabric including a protective laminate.

A fabric 10, for use, e.g., in a protective garment, is shown diagrammatically in FIG. 1. Fabric 10 includes a protective laminate 12 and a textile layer 14. In this embodiment, protective laminate 12 includes a highly impermeable layer 16 interposed between two non-textile layers 18 and 20. While the layers of fabric 10 are exploded in FIG. 1, for clarity, in the finished fabric all of the layers would be attached to each other, e.g., by adhesive or lamination as will be discussed below. Typically, one of the layers of the protective laminate is attached to a textile, forming a preliminary laminate, and then the other layers are applied to this preliminary laminate. However, if desired all of the layers can be laminated together in a single processing step or in a different order of steps.

Highly impermeable layer 16 may be a free-standing film prior to being attached to the non-textile layers. Suitable highly impermeable layers are highly impermeable to chemicals. It is generally preferred that the highly impermeable layer comply with the liquid penetration resistance requirement associated with NFPA 1971, 2000 edition.

Suitable highly impermeable layers may be relatively brittle, and thus tend to exhibit a reduction in chemical impermeability when flexed, as discussed above. For example, the highly impermeable layer, when tested alone, may exhibit visually observable cracking after 50 to 500 cycles using a Newark Flex Tester according to the test procedure specified in ASTM D2097, under the environmental conditions specified in ASTM D1610. The highly impermeable layer typically has a thickness of less than about 50 μm, e.g., from about 5 to 50 μm.

Suitable barrier films are breathable, i.e., they have an MVTR of at least 200 g/m$^2$/day, measured by ASTM E96B. In some implementations, the highly impermeable layer has an MVTR of from about 200 to 5000. The highly impermeable layer may be monolithic or microporous.

One suitable highly impermeable layer is a polyether sulfone (PES) film that is treated with a fluoropolymer to modify its surface energy, commercially available from Pall Corp. under the tradename SUPOR. Another suitable highly impermeable layer is a film of fluorinated ion exchange polymer, such as the film commercially available from DuPont under the trademark NAFION®.

The fluorinated ion exchange polymer employed in accordance with this invention preferably has anionic functionality, most preferably sulfonate functional groups, which may be in the hydrogen ion, ammonium ion, or metal ion form. Preferably, the polymer is in metal ion or hydrogen ion (proton) form in the garment, more preferably the sodium ion form or the hydrogen ion form. Preferably, the polymer comprises a polymer backbone with recurring side chains attached to the backbone, the side chains carrying the ion exchange groups. Preferably, there is at least one and more preferably two fluorine atoms attached to the carbon atom of the side chain to which the ion exchange group is attached. It is especially preferable to employ "highly fluorinated" ion exchange polymer. By "highly fluorinated" is meant that in the polymer in ion exchange form at least half the monovalent atoms bound to carbon atoms are fluorine atoms. The fluorinated ion exchange polymers can be copolymers of fluorinated monomers containing the sulfonic functional group with nonfunctional monomers, usually the predominant monomer in the polymer, referred to herein as fluoromonomer-based polymers. Examples of fluorinated monomers containing the sulfonic functional group (in precursor form) are the perfluorinated vinyl ethers $CF_2=CF-O-CF_2CF(CF_3)-O-CF_2CF_2SO_2F$, perfluoro(3,6-dioxa-4-methyl-7-octenesulfonyl fluoride) and $CF_2=CF-O-CF_2CF_2SO_2F$, perfluoro(3-oxa-4-pentenesulfonyl fluoride). Examples of nonfunctional fluoromonomers are tetrafluoroethylene, trifluoroethylene, vinylidene fluoride, vinyl fluoride and chlorotrifluoroethylene. The polymers employed in accordance with the present invention are preferably tetrafluoroethylene-based polymers, i.e., where the nonfunctional monomer is predominately tetrafluoroethylene. Most preferably, the polymers employed are perfluorinated. By perfluorinated is meant that substantially all the monovalent atoms bound to carbon atoms on the backbone of the polymer (the main chain) are fluorine atoms. Some of the monovalent atoms bound to carbon atoms at the end of the main chain may be hydrogen atoms, such as might be derived from chain transfer agents. Such polymers and their preparation are well-known in the art, and are described in U.S. Pat. Nos. 3,282,875, 4,358,545 and 4,940,525. In addition to having good water vapor transport properties, such polymers are unaffected by many of the chemicals used in decontamination of protective garments.

The fluorinated ion exchange polymer is characterized by equivalent weight, that is, the weight in grams of polymer in the hydrogen ion form that neutralize one equivalent of base, such as sodium hydroxide. The equivalent weight of fluorinated ion exchange polymer of this invention is about 500 to 1500, preferably about 700 to 1300, more preferably about 800 to 1200, still more preferably about 850 to 1150, and most preferably about 900 to 1100.

The fluorinated ion exchange polymer film used in making the highly impermeable layer may be prepared by extrusion of fluorinated ion exchange polymer. This is done with the polymer in a melt processible precursor form (the hydrogen ion or other ionic forms of fluorinate ion exchange polymers are not easily melt processed). The usual form for melt processing of a polymer having sulfonate functional groups is the sulfonyl fluoride form. After melt processing, the sulfonyl fluoride can be hydrolyzed to the sulfonic acid salt form by treatment with aqueous base, preferably potassium hydroxide (KOH), and preferably in the presence of a cosolvent, such as dimethyl sulfoxide (DMSO). A typical formulation is 10-15 wt % KOH, 10-15 wt % DMSO, and the balance water. Typical hydrolysis times and temperatures are 15-60 minutes at 50-90° C. The resulting fluorinated ion exchange polymer is in the potassium salt form and may be converted to other ionic forms by ion exchange with the appropriate solutions, e.g. 10-20 wt % aq. nitric acid if the hydrogen ion form is desired, 10-20 wt % aq. sodium chloride solution for the sodium ion form. After treatment, the film is washed with deionized water several times and dried at temperatures not exceeding about 150° C., preferably not exceeding 100° C.

Alternatively, the film can be made by casting an aqueous alcoholic solution of NAFION®, available from Aldrich Chemical Co. Milwaukee Wis. or DuPont Company, Wilmington Del. The solution dries to form film in the hydrogen ion form. This may be ion exchanged to make other ionic forms. Ion exchange is accomplished using an aqueous solution of from 1 to 10 wt % of a salt, oxide, or hydroxide of the desired cation, such as sodium chloride or sodium hydroxide if the sodium ion form is wanted. Oxides or hydroxides are preferred under conditions where their more or less high alkalinity can be tolerated. For ion exchange of the film when it is adhered to fabric, salt is preferred as less likely to affect the fabric adversely. Exchange is rapid, 0.5 to 10 hours being enough time. The exchanged film (and fabric if present) is rinsed 2 to 3 times in water to removes excess salt or hydroxide. All this is done at room temperature.

The highly impermeable layer can be a composite of fluorinated ion exchange polymer on a porous support. One such a composite is expanded polytetrafluoroethylene (ePTFE), GORE-TEX® is an example, impregnated with fluorinated ion exchange polymer. Composites of this type are disclosed in U.S. Pat. Nos. 5,547,551 and 5,599,614. A composite of fluorinated ion exchange polymer film adhered to ePTFE is disclosed in U.S. Pat. No. 5,082,472. This structure may additionally be partially or completely impregnated with fluorinated ion exchange polymer.

A suitable highly impermeable layer is a perfluorosulfonic acid film (tetrafluoroethylene/perfluoro (4-methyl-3,6-dioxa-7-octene-1-sulfonic acid) copolymer), CAS Number 31175-20-9, such as that sold by DuPont under the trademark NAFION®. The NAFION® films have a tensile modulus (ASTM D 882) at 23° C. and 50% RH of about 249 MPa, a tensile modulus at 23° C. when water soaked of about 114 MPa, and a tensile modulus at 100° C. when water soaked of about 64 MPa. The elongation at break (ASTM D 882) shows a similar decrease when the films are water soaked. The NAFION® films exhibit an elongation at break at 23° C. and 50% RH of about 225% in the machine direction and 310% in the transverse (cross-machine) direction, an elongation at break at 23° C. when water soaked of about 200% in the machine direction and 275% in the transverse direction, and an elongation at break at 100° C. when water soaked of about 180% in the machine direction and 240% in the transverse direction. Other properties of the NAFION® films include an MVTR of about 4000 g/m²/day, and a thickness of about 1 to 100 μm, typically about 5 to 50 μm.

The non-textile layers 18 and 20 may be the same or different. One or the other of the non-textile layers may be omitted. Thus, the protective laminate may include only inner non-textile layer 18, leaving highly impermeable layer 16 exposed (i.e., the fabric 10 includes an inner non-textile layer 18 interposed between a highly impermeable layer 16 and a textile layer 14), or the protective laminate may include only outer non-textile layer 20, so that the highly impermeable layer 16 is in direct contact with the textile layer 14 in the finished fabric (i.e., the fabric 10 includes a highly impermeable layer 16 interposed between an outer non-textile layer 20 and a textile layer 14). Other configurations may also be possible.

Suitable materials for use in the non-textile layer(s) include films and other materials that will mitigate the reduction in chemical impermeability of the highly impermeable layer when the protective laminate is flexed. Preferred non-textile layer materials will substantially eliminate the reduction in impermeability over a large number of flex cycles, i.e., will mitigate the reduction in impermeabilty sufficiently so that the protective laminate will still pass the liquid penetration resistance requirement associated with NFPA 1971, 2000 edition even after repeated flexing. The non-textile layer increases the number of flex cycles prior to visually observable cracking by at least about 10%, preferably at least about 50%, and more preferably at least about 100%, in comparison to the highly impermeable layer alone as measured under comparable test conditions, such as sample thickness. The use of non-textile layers on both sides of the highly impermeable layer increases the number of flex cycles by at least about 50%, preferably at least about 200%, more preferably at least about 500%, and most preferably at least about 1000%. In some implementations, the use of non-textile layers on both sides of the highly impermeable layer is preferred.

The non-textile layer typically has a thickness of less than about 70 μm, and preferably is from about 0.001 to 0.050 mm thick, more preferably, about 0.002 to 0.025 mm thick.

Suitable materials for use as non-textile layers are breathable, i.e., have an MVTR of at least 200 g/m²/day, measured by ASTM E96B. It is generally preferred that the breathability of the non-textile layer be similar to or greater than that of the highly impermeable layer. Thus, the breathability of the non-textile layer is generally in the range of about 200 to 5000. If desired, the layers of the laminate may have different levels of breathability, provided the overall breathability of the laminate is adequate for its intended use. The non-textile layer may be monolithic or microporous, and may be a film or other continuous or discontinuous sheet material. When the protective laminate includes two non-textile layers, as shown in FIG. 1, one can be monolithic and the other can be microporous, or both can be monolithic or microporous.

In some implementations, the polymers for the non-textile layer are hydrophilic. Hydrophilic polymers transfer substantial amounts of water vapor through a film of the polymer by absorbing water on one side of the film where the water concentration is high, and desorbing or evaporating it on another side where the water concentration is lower.

Suitable materials for non-textile layers are sufficiently flexible at the thickness employed to be suitable for the particular end use application. In some cases, the polymer of the non-textile layer is elastomeric. The term "elastomer" as used herein means a polymer which exhibits rapid and nearly complete recovery from an extending force. Elastomer can be stretched to about 100% without breaking. After such stretch and being held for about 5 minutes and then released, the elastomer will retract to within about 10% of its original length within about 5 minutes after release.

Preferred materials for non-textile layers facilitate secure attachment of textiles layers to the laminate, i.e., by attaching the textile to the non-textile layer. With some highly impermeable layers such as fluorinated ion exchange polymer, sufficiently secure attachment to the highly impermeable layer to endure repeated wash cycles is difficult to achieve. In addition, preferred non-textile layers can also assist with secure attachment at seams to enable the seams to be adequately sealed.

A preferred non-textile layer is made of hydrophilic polyurethane or polyether block amide. An example of a suitable hydrophilic polyurethane film is TX1540 film, commercially available from Omniflex under the tradename TRANSPORT. This film is a hydrophilic polyurethane, having a 100% modulus of about 550-650 psi and a thickness of about 0.5-25 μm. An example of a suitable polyether block amide layer is TX4100 film commercially available from Omniflex.

Other suitable films for use as non-textile layers include other hydrophilic polyurethane films, e.g., TX1530 film, commercially available from Omniflex; microporous polyurethane, e.g., P3 series films commercially available from Porvair; expanded polytetrafluoroethylene (ePTFE), e.g., ePTFE films commercially available from W.L. Gore, Tetratec and BHA; hydrophilic co-polyester films, e.g., SYMPATEX films from Sympatex Technologies and HYTREL films from DuPont; polyamide-elastomer alloy films, e.g., TX3050 films commercially available from Omniflex; other polyether block amide films, e.g., films formed from PEBAX resins (Arkema); and microporous polyolefin films, e.g., microporous polyethylene films. Other suitable hydrophilic polyurethane films include films formed from 58245 resin, commercially available from Noveon.

In most cases, the non-textile layer will have a lesser degree of chemical impermeability to certain chemicals than the highly impermeable layer. In such cases, the non-textile layer may not, by itself, have adequate chemical impermeability for use in the application for which the protective laminate is intended.

The textile layer may be any desired textile, including woven, knitted and nonwoven materials and composites of such materials. The textile may be selected based on the properties required for a given application, e.g., flame and/or heat resistance, thermal properties, comfort, weight, and moisture vapor transmissivity. Suitable textiles include 332N NOMEX® fabric, available from Southern Mills, NYCO fabric, available in a camouflage print from Bradford Dye, and 70d taslanized nylon. Other suitable textiles include nonwovens such as VILENE® nonwoven, commercially available from Freudenberg, and E89™ nonwoven, commercially available from DuPont. The textile layer generally has a thickness of from about 0.1 to 1.0 mm. The textile layer generally does not contribute significantly to the mitigation of the loss of chemical impermeability of the highly impermeable layer, but does frequently offer physical protection against abrasion tear and puncture.

The fabric 10 (textile layer and protective laminate) will typically have an MVTR of at least 200 g/m²/day as measured by ASTM E96B. In some implementations, the MVTR will be from about 200 to 5000 g/m²/day, e.g., from about 1000 to 3000 g/m²/day. The fabric 10 will generally comply with the liquid penetration resistance requirement associated with NFPA 1971, 2000 edition, and with other industry standards regarding impermeability, for example chemical penetration after laundering according to the laundering procedure specified in AATCC 135.

Various techniques may be used to join the layers of the protective laminate, and to join the protective laminate to the textile layer. For example, the non-textile layer(s) may be bonded to the highly impermeable layer using an adhesive, such as a solvent based crosslinking polyurethane adhesive, a reactive hot melt-polyurethane adhesive, or a thermoplastic adhesive, e.g., a thermoplastic polyester, polyurethane, nylon or olefinic adhesive supplied, for example, as a hot melt, film, or powder- or web-based system. When the highly impermeable layer comprises fluorinated ion exchange polymer, it is preferred that the fluorinated ion exchange polymer be in the hydrogen ion (proton) form as this form allows better adhesion of other layers to the highly impermeable layer.

The adhesive may be applied as a discontinuous layer to one or both of the layers to be adhered, e.g., using direct gravure printing. The discontinuous adhesive may be applied in any desired pattern, e.g., lines, dots, polygons, or other shapes. Suitable methods for applying an adhesive in a discontinuous pattern are described, for example, in U.S. Pat. No. 5,874,140, the disclosure of which is incorporated by reference herein.

Alternatively, the layers may be thermally fused or pressure laminated, without any intervening adhesive. The process parameters for this operation will vary depending on the materials used for the non-textile and highly impermeable layers, and would be selected to provide good adhesion without significant damage or deterioration of any of the layers.

The following examples are intended to be illustrative and not limiting in effect.

EXAMPLE 1

A protective laminate was formed using a multi-pass process, as follows:

Pass 1: A barrier film (0.019 mm perfluorosulfonic acid, commercially available from DuPont under the tradename NAFION®) was laminated to a woven textile layer known in the trade as NYCO and manufactured from a blend of cotton, nylon and a small percentage of carbon fiber. The film was printed with a solvent-based crosslinking polyurethane adhesive system having a viscosity of 15,000 to 25,000 cps on a gravure applicator with a discontinuous dot pattern. The film and textile layer were combined in a nip at a processing speed of 10 to 20 yards per minute. The adhesive was then allowed to cure for a few days.

Pass 2: The film side of the barrier/textile laminate created in Pass 1 was printed with adhesive as described above in Pass 1, and the barrier/textile laminate was combined with a non-textile layer (a 0.005 mm hydrophilic polyurethane film having a Shore hardness of 80 A and a 100% modulus of 550-650 psi, commercially available from Omniflex under the tradename Transport TX1540) at a processing speed of 10 to 20 yards per minute.

EXAMPLE 2

A laminate was made as discussed in Example 1 above, except that in Pass 1 the barrier film used was a polyether sulfone (PES) film that is treated with a fluoropolymer to modify its surface energy, commercially available from Pall Corp. under the tradename SUPOR.

EXAMPLE 3

To test the effect of providing a non-textile layer on the flexural properties of highly impermeable layers, the non-textile layer described above in Example 1 was laminated to one side and to both sides of the barrier films described in Examples 1 and 2. The textile layer was omitted.

These laminates were flex tested through multiple flexing cycles using a Newark Flexing Machine according to the procedure specified in ASTM D2097, under the ambient conditions specified in ASTM D1610. As a control, the two highly impermeable layers were individually subjected to the same testing. The samples were observed visually, and were deemed to have failed on the cycle at which the first visually observable cracking occurred.

The results of this testing were as follows: the NAFION highly impermeable layer alone withstood 87 cycles, while the PES highly impermeable layer alone withstood 394 cycles. Adding a single non-textile layer increased the number of cycles before failure by 887% and 33%, respectively. Adding non-textile layers on both sides of the barrier film increased the number of cycles before failure by 1817% and 599%, respectively.

A number of embodiments of the invention have been described. Nevertheless, it will be understood that various modifications may be made without departing from the spirit and scope of the invention.

For example, while the non-textile layer has been described above as a film, in some cases the non-textile layer may be a coating. The coating may be formed by applying a liquid directly to the highly impermeable layer, or by casting the liquid onto a release surface and then transferring the cast coating from the release surface to the highly impermeable layer. The liquid may be a polymeric solution. For example, a polymer such as a thermoplastic polyurethane, e.g., polymers commercially available from Noveon under the designations 58245 or 58237, may be solvated and the solution may be cast and transferred as described above. Suitable coatings include, for example, hydrophilic polyurethane systems, such as the HYPOL series available from Dow Chemical or COMFOR-TEX 52158, available from Raffi & Swanson. The typical application weight is generally from about 0.2 oz/sq.yd. to 1.0 oz/sq.yd.

Alternatively, the non-textile layer may be provided as a film and the highly impermeable layer may be formed by applying a coating of liquid solution or dispersion of the highly impermeable layer polymer directly to the non-textile layer.

Moreover, in addition to the arrangements discussed above (non-textile layers on one or both sides of a single highly impermeable layer) other arrangements are possible. For example, a single non-textile layer can be interposed between two highly impermeable layers, e.g., if it is desirable to protect the non-textile layer from exposure to chemicals. One or more additional non-textile and/or highly impermeable layers may be included in any of these arrangements. Also, while a single textile layer is shown in FIG. 1 and described above, the fabric may include multiple textile layers on a single side of the protective laminate, or the protective laminate may be interposed between multiple textile layers.

The resulting fabric can be used in any desired manner. For example, the fabric can be cut according to a pattern, and the patterned pieces can then be sewn to form a garment. The fabrics are suitable for use in protective garments. In some implementations, the fabrics are suitable for use in garments for applications such as firefighting, hazardous waste cleanup, and environmental remediation.

Accordingly, other embodiments are within the scope of the following claims.

What is claimed is:

1. A protective laminate comprising:
   a layer that is breathable, and highly impermeable to chemicals to a degree that is subject to reduction upon flexing of the highly impermeable layer alone, the highly impermeable layer comprising a fluorinated ion exchange polymer;
   a first non-textile layer attached to the highly impermeable layer, the first non-textile layer being continuous and mitigating the reduction in the impermeability of the highly impermeable layer if the laminate is flexed; and
   a second non-textile layer, wherein the highly impermeable layer is interposed between the non-textile layers.

2. The protective laminate of claim 1 further comprising a textile layer attached to the highly impermeable layer.

3. The protective laminate of claim 1 further comprising a textile layer attached to one of the non-textile layers.

4. The protective laminate of claim 1 wherein at least one non-textile layer comprises a hydrophilic polymer.

5. The protective laminate of claim 1 wherein at least one non-textile layer comprises an elastomeric polymer.

6. The protective laminate of claim 1 wherein at least one non-textile layer comprises a polymer selected from the group consisting of polyurethane, copolyester, polyether block amide, polyamide-elastomer alloy, and mixtures thereof.

7. The protective laminate of claim 1 wherein at least one non-textile layer comprises polyurethane or polyether block amide.

8. The protective laminate of claim 1 wherein the protective laminate has a MVTR of at least 2000.

9. The protective laminate of claim 1 wherein the highly impermeable layer is microporous.

10. The protective laminate of claim 1 wherein the highly impermeable layer is monolithic.

11. The protective laminate of claim 1 wherein at least one non-textile layer is microporous.

12. The protective laminate of claim 1 wherein at least one non-textile layer is monolithic.

13. The protective laminate of claim 1 wherein the highly impermeable layer has a thickness of about 1 to 100 µm.

14. The protective laminate of claim 1 wherein at least one non-textile layer has a thickness of about 1 to 50 µm.

15. The protective laminate of claim 1 further comprising a second highly impermeable layer, wherein the first non-textile layer is interposed between the highly impermeable layers.

16. The protective laminate of claim 1 wherein the at least one non-textile layer comprises a breathable hydrophilic polymer.

17. The protective laminate of claim 16, wherein the breathable hydrophilic polymer comprises an elastomer.

18. The protective laminate of claim 1 wherein the highly impermeable layer comprises a perfluorinated ion exchange polymer.

19. The protective laminate of claim 1 wherein the fluorinated ion exchange polymer comprises sulfonate functional groups.

20. The protective laminate of claim 19 wherein the sulfonate functional groups are in hydrogen ion or sodium ion form.

21. The protective laminate of claim 1 wherein the protective laminate has a MVTR of at least 200.

22. The protective laminate of claim 1 wherein at least one non-textile layer has a thickness of about 2 to 25 µm.

23. The protective laminate of claim 1 wherein at least one non-textile layer is attached to the highly impermeable layer by being thermally bonded directly to the highly impermeable layer without intervening adhesive.

24. The protective laminate of claim 1 wherein the laminate forms at least a portion of a protective structure, garment, or footwear insert.

25. The protective laminate of claim 24 wherein the protective structure forms at least a portion of a tent.

26. The protective laminate of claim 24 wherein the garment forms at least a portion of a glove.

* * * * *